US012670621B2

(12) United States Patent
Hehn et al.

(10) Patent No.: US 12,670,621 B2
(45) Date of Patent: *Jun. 30, 2026

(54) METHOD AND SYSTEM FOR TRACKING A STATE OF A CAMERA

(71) Applicant: Verity AG, Zürich (CH)

(72) Inventors: Markus Hehn, Zürich (CH); Lino Widmer, Zürich (CH); Fabio Rossetto, Zürich (CH)

(73) Assignee: Verity AG, Zurich (CH)

( * ) Notice: Subject to any disclaimer, the term of this patent is extended or adjusted under 35 U.S.C. 154(b) by 440 days.

This patent is subject to a terminal disclaimer.

(21) Appl. No.: 18/270,402

(22) PCT Filed: Dec. 13, 2021

(86) PCT No.: PCT/IB2021/061639
§ 371 (c)(1),
(2) Date: Jun. 29, 2023

(87) PCT Pub. No.: WO2022/144654
PCT Pub. Date: Jul. 7, 2022

(65) Prior Publication Data
US 2024/0070914 A1      Feb. 29, 2024

Related U.S. Application Data

(60) Provisional application No. 63/132,142, filed on Dec. 30, 2020, provisional application No. 63/132,176, filed on Dec. 30, 2020.

(51) Int. Cl.
G06T 7/73          (2017.01)
G06T 7/246        (2017.01)
G06T 7/277        (2017.01)

(52) U.S. Cl.
CPC ............... G06T 7/75 (2017.01); G06T 7/251 (2017.01); G06T 7/277 (2017.01);
(Continued)

(58) Field of Classification Search
CPC . G06T 2207/10004; G06T 2207/10028; G06T 2207/30204; G06T 2207/30252;
(Continued)

(56) References Cited

U.S. PATENT DOCUMENTS

| | | | |
|---|---|---|---|
| 10,209,081 B2 * | 2/2019 | Ghadiok | ................ G01C 21/28 |
| 2013/0051626 A1 * | 2/2013 | Abadpour | ............ G06V 20/647 |
| | | | 382/106 |

(Continued)

OTHER PUBLICATIONS

Plank, Hannes, et al. "High-performance indoor positioning and pose estimation with time-of-flight 3D imaging." 2017 international conference on indoor positioning and indoor navigation (IPIN). IEEE, 2017. (Year: 2017).*

(Continued)

*Primary Examiner* — Gregory A Morse
*Assistant Examiner* — Stefano Anthony Dardano
(74) *Attorney, Agent, or Firm* — BLANK ROME LLP

(57) ABSTRACT

The invention relates to a method for determining a state $x_k$ (7) of a camera (11) at a time $t_k$, the state $x_k$ (7) being a realization of a state random variable $X_k$, wherein the state is related to a state-space model of a movement of the camera (11). The method comprises the following steps: a) receiving an image (1) of a scene of interest (8) in an indoor environment (8) captured by the camera (11) at the time $t_k$, wherein the indoor environment (8) comprises N landmarks (9) having known positions and orientations in a world coordinate system (12), N being a natural number; b) receiving a state estimate Formula I (2) of the camera (11) at the time $t_k$, wherein the state estimate (2) comprises an estimate of the pose of the camera; c) determining (3) positions of M features in the image (1), M being a natural number; and d) determining (6) the state $x_k$ (7) of the camera (11) at the time $t_k$ based on (i) observation $z_k$ at the time $t_k$, the observation $z_k$ being a realization of a joint observation
(Continued)

random variable $z_k$, the observation $z_k$ comprising the positions of the M features and data indicative of distance between each of the M features and its corresponding object point in the scene of interest, respectively, and (ii) the state estimate Formula ˆI (2), wherein the determining (6) of the state $x_k$ (7) comprises determining (4) an injective mapping estimate from at least a subset of the M features into the set of the N landmarks (9), and wherein the determining (6) of the state $x_k$ (7) is based on an observation model set up (5) based on the determined injective mapping estimate. The invention also relates to a computer program product and to an assembly.

22 Claims, 6 Drawing Sheets

(52) U.S. Cl.
CPC ............... *G06T 2207/10028* (2013.01); *G06T 2207/30204* (2013.01); *G06T 2207/30252* (2013.01)

(58) Field of Classification Search
CPC .......... G06T 7/251; G06T 7/277; G06T 7/75; G06T 7/73; G06T 9/002; G06T 9/40; G06V 10/422; G06V 10/44; G06V 10/751
See application file for complete search history.

(56) References Cited

U.S. PATENT DOCUMENTS

| | | | | |
|---|---|---|---|---|
| 2015/0310669 | A1* | 10/2015 | Kamat | .................. G06T 19/006 |
| | | | | 345/633 |
| 2016/0154408 | A1* | 6/2016 | Eade | ....................... G06F 16/24 |
| | | | | 701/523 |
| 2016/0379078 | A1* | 12/2016 | Yano | ....................... G06T 7/194 |
| | | | | 382/199 |
| 2020/0404245 | A1* | 12/2020 | Karvounis | ........... H04N 13/239 |

OTHER PUBLICATIONS

Kim, Whoi-Yul, and Avinash C. Kak. "3-D object recognition using bipartite matching embedded in discrete relaxation." IEEE Transactions on Pattern Analysis & Machine Intelligence 13.03 (1991): 224-251. (Year: 1991).*
International Search Report and Written Opinion for PCT/IB2021/061639, dated Mar. 10, 2022, 11 pages.
Alvarado Vasquez et al., "Sensor Fusion for Tour-Guide Robot Localization", IEEE Access, vol. 6, Dec. 12, 2018, 18 pgs.
M. Maidi, et al., "A Performance Study for Camera Pose Estimation using Visual Marker Based Tracking", Machine Vision and Applications, 2010, pp. 365-376.
Z. Zhu, et al., "High-Precision Localization using Visual Landmarks Fused with Range Data", Computer Vision and Pattern Recognition (CVPR), 2011 IEEE Conference, IEEE, Jun. 20, 2011, pp. 81-88.
S. Huh, et al., "Integrated Navigation System using Camera and Gimbaled Laser Scanner for Indoor and Outdoor Autonomous Flight of UAVs", 2013 IEEE/RSJ International Conference on Intelligent Robots and Systems (IROS), Nov. 3-7, 2013, pp. 3158-3163.
B. Coltin, et al., "Localization from Visual Landmarks on a Free-Flying Robot", 2016 IEEE/RSJ International Conference on Intelligent Robots and Systems (IROS) Daejeon Convention Center, Oct. 9-14, 2016, pp. 4377-4382.

* cited by examiner

Layer 1          Layer 2

METHOD AND SYSTEM FOR TRACKING A STATE OF A CAMERA

RELATED APPLICATIONS

This application is a national phase of PCT/IB2021/061639, filed on Dec. 13, 2021, which claims priority to U.S. Provisional Application No. 63/132,142, filed on Dec. 30, 2020, and U.S. Provisional Application No. 63/132,176, filed on Dec. 30, 2020. The contents of these applications are hereby incorporated by reference in their entirety.

FIELD OF THE INVENTION

The present invention relates to a method and system for determining a state $x_k$ of a camera at a time $t_k$.

BACKGROUND TO THE INVENTION

Indoor navigation of robots, for example drones, is an important problem, e.g., in the field of automatic warehousing. To facilitate indoor navigation, the robot, e.g., the drone, needs to know its current position with respect to its environment. Contrary to outdoor environments in which GNSS (Global Navigation Satellite Systems) can be employed, providing a high localization accuracy, GNSS in indoor environments is often not reliable due to signal attenuation and multi-path effects. Existing RF localization technologies for indoor and outdoor spaces also struggle with signal attenuation and multi-path effects limiting the usability in complex environments, for instance, in the presence of a significant amount of metal.

In the prior art, optical localization systems for indoor localization are known. Such optical localization systems extract information from images captured by a camera. The location of an object of which the pose is to be determined can then be computed using triangulation techniques after relating the coordinates of features in the two-dimensional camera image to three-dimensional rays corresponding to said features. The relation between image coordinates and three-dimensional rays is typically captured in a combination of first-principle camera models (such as pinhole or fisheye camera models) and calibrated distortion models (typically capturing lens characteristics, mounting tolerances, and other deviations from a first-principle model).

In optical localization systems for determining the location of an object known in the prior art, the camera can be rigidly mounted outside the object, observing the motion of the object ("outside-in tracking"), or the camera can be mounted on the object itself observing the apparent motion of the environment ("inside-out tracking"). While outside-in tracking localization systems typically determine the location of the object relative to the known locations of the camera(s), inside-out tracking systems like SLAM (Simultaneous Localization and Mapping) typically generate a map of the environment in which the object moves. The map is expressed in an unknown coordinate system but can be related to a known coordinate system in case the locations of at least parts of the environment are already known or if the initial pose of the camera is known. In both cases, some error will accumulate as the map is expanded away from the initial field of view of the camera or from the parts of the environment with known location. The potential for propagating errors is a problem for applications where the location information must be referred to external information, for example to display the location of the object in a predefined map, to relate it to the location of another such object, or when the location is used to guide the object to a location known in an external coordinate system.

Outside-in optical localization systems typically scale very poorly to larger localization systems because at every point, the object must be seen by several cameras to triangulate the 3D position of the object. Especially for large spaces where only few objects are tracked this is economically not viable.

In inside-out optical localization systems, the environment may be equipped with well-defined landmarks. Such landmarks are typically assumed to be located at known positions. As the camera moves through the environment and captures images of said environment, the captured images will comprise projections of the landmarks. Landmarks in state-of-the-art inside-out optical localization systems are often embodied as retroreflectors. To utilize the captured projections of the landmarks in the image for tracking the movement of the camera, the captured projections need to be assigned to the landmarks to which they correspond: this correspondence problem may be termed feature-to-landmark assignment problem, for captured projected landmarks may be considered to be features. Methods known from the state of the art for determining a feature-to-landmark assignment may be prone to errors or may be costly from a computational perspective.

It is an object of the present invention to mitigate at least some of the disadvantages associated with the methods for estimating a state $x_k$ of a camera known from the state of the art.

SUMMARY OF THE INVENTION

According to a first aspect of the present invention there is provided a method for determining a state $x_k$ of a camera, involving the steps recited in claim 1. Further features and embodiment of the method of the present invention are described in the dependent patent claims.

The invention relates to a method for determining a state $x_k$ of a camera at a time $t_k$, the state $x_k$ being a realization of a state random variable $X_k$, wherein the state is related to a state-space model of a movement of the camera. The method comprises the following steps: a) receiving an image of a scene of interest in an indoor environment captured by the camera at the time $t_k$, wherein the indoor environment comprises N landmarks having known positions in a world coordinate system, N being a natural number; b) receiving a state estimate $\widehat{x_k}$ of the camera at the time $t_k$, wherein the state estimate comprises an estimate of the pose of the camera; c) determining positions of M features in the image, M being a natural number; and d) determining the state $x_k$ of the camera at the time $t_k$ based on (i) observation $z_k$ at the time $t_k$, the observation $z_k$ being a realization of a joint observation random variable $Z_k$, the observation $z_k$ comprising the positions of the M features and data indicative of distance between each of the M features and its corresponding object point in the scene of interest, respectively, and (ii) the state estimate $\widehat{x_k}$, wherein the determining of the state $x_k$ comprises determining an injective mapping estimate from at least a subset of the M features into the set of the N landmarks, and wherein the determining of the state $x_k$ is based on an observation model set up based on the determined injective mapping estimate.

Each feature in at least the subset of the M features has a corresponding landmark of which it is a projection, i.e., the capturing of the image by the camera at the time $t_k$ establishes a projection of 3D space to a 2D image plane. The orientations of the N landmarks in the world coordinate system may also be known. Since the camera is a projective device, it captures objects in the scene of interest and projects them onto the 2D image plane. The landmarks in the scene of interest which is in the indoor environment are objects. Each of the M features has a corresponding object point in the scene of interest in the indoor environment, wherein the corresponding object point corresponds to that part of the scene of interest which—upon projection by the camera onto the 2D image plane—leads to the respective feature. The corresponding object point may therefore be embodied as a landmark. Alternatively, the data indicative of distance may also relate to distances between a camera center of the camera and the object points in the scene of interest corresponding to the M features.

In an embodiment of the method according to the invention, the joint observation random variable 4 comprises M observation random variables $Z_{k,i}$, i=1, . . . , M, which M observation random variables are ordered in an observation random variable sequence, wherein a realization of the observation random variable sequence provides an observation sequence $z_{k,i}$, i=1, . . . , M.

In a further embodiment of the method according to the invention, the determining of the injective mapping estimate, as part of the determining of the state $x_k$, from at least the subset of the M features into the set of N landmarks, the subset comprising L features, is based on a tree data structure having leaf nodes and inner nodes, and having a start node and at most a tree depth of L, wherein the tree data structure is constructed during the determining of the state $x_k$ and the determining of the injective mapping estimate as part of the determining of the state $x_k$, and wherein each layer of the L layers of the tree data structure is associated with a sequence element of a subsequence of the observation sequence, wherein said subsequence comprises those sequence elements from the observation sequence corresponding to the L features, and wherein each node in the tree data structure except the start node is associated with a 5-tuple comprising (a) a layer number i related to the layer of the tree data structure in which the respective node is arranged, (b) an observation $z_{k,i}$, (c) a landmark assigned to the observation $z_{k,i}$, wherein the assigned landmark and the layer number i provide a feature-to-landmark assignment associated to the respective node, (d) a node-specific intermediate state of the camera, wherein said node-specific intermediate state of the camera is determined based on feature-to-landmark assignments corresponding to nodes on a path from the start node to the respective node in layer number i, and (e) a cost related to (i) the observation $z_{k,i}$, (ii) the assigned landmark, and (iii) the node-specific intermediate state of the camera, wherein the start node is associated to a cost of zero and has layer number 0, and wherein each node in the tree data structure comprises a unique path to the start node. The determining of the injective mapping estimate is based on (i) a cost determination function which is configured to determine, (a) for each leaf node in a currently constructed tree data structure, a cost, which cost is a sum of all costs associated to the nodes on the path between the start node and the respective leaf node and including the respective leaf node, and (b) a leaf node with the lowest cost, and (ii) a tree construction function which receives as input a leaf node in a currently constructed tree data structure having layer number i, and constructs N−i new leaf nodes in layer i+1 corresponding to observation $z_{k,i+1}$, wherein said N−i new leaf nodes are connected to the received leaf node, and which N−i new leaf nodes are related to the N−i landmarks which have not been previously considered on the path between the start node and the received leaf node including the received leaf node, and wherein the cost of each of the N−i new leaf nodes is based on the conditional probability density of observing $z_{k,i+1}$ under the assumption that $z_{k,i+1}$ is induced by one of the N−i landmarks using a corresponding observation model, respectively, which corresponding observation model is set up under the assumption that the camera is in a node-specific intermediate state determined based on the feature-to-landmark assignments on the path from the start node to the received leaf node, or under the assumption that the camera is in the state according to the state estimate $\widehat{x_k}$ in case the tree construction function receives the start node as input, wherein the tree construction function outputs a tree data structure with at least i+1 constructed layers. The determining of the injective mapping estimate as part of the determining of the state $x_k$ proceeds by iteratively invoking the function pair (i) the tree construction function, in a first iteration having the start node as input, and (ii) the cost determination function evaluated on the output of the tree construction function, wherein the leaf node with the lowest cost provided by the cost determination function evaluated on a currently constructed tree data structure is used as input to the tree construction function in a next iteration, and wherein the iteration finishes once all L layers of the tree data structure are constructed and a finish leaf node in the L-th layer has, upon evaluation by the cost determination function, the lowest cost of all leaf nodes in the tree data structure, and wherein upon finishing, the injective mapping estimate is encoded in the path between the start node and the finish leaf node in the L-th layer, and wherein upon finishing, the state $x_k$ of the camera is determined based on the feature-to-landmark assignments on the path from the start node to the finish leaf node.

In a further embodiment of the method according to the invention, the cost of a node in layer number i of the tree data structure is related to a conditional probability density $p(Z_{k,i}|X_k=\text{"node–specific intermediate state"})$, and the cost is obtained by taking a logarithm of the conditional probability density.

In a further embodiment of the method according to the invention, for each of the L features, the corresponding data indicative of distance is used for determining a candidate subset of the N landmarks to which the respective feature may correspond, and using the candidate subsets for the determining of the injective mapping estimate as part of the determining of the state $x_k$.

In case the data indicative of distance corresponds to a measured distance d between a feature and landmark, wherein the feature is the projection of the landmark captured by the camera at the time $t_k$, a candidate subset for said feature may comprise those landmarks from the N landmarks which are not too far away from the feature. The candidate subset for said feature may comprise all those landmarks whose distance to the feature is in the interval [d−T,d+T], wherein T is a pre-determined number.

In a further embodiment of the method according to the invention, the tree construction function, evaluated on a node in layer i, considers only those landmarks during construction of the nodes in layer i+1 connected to the node in layer i which are in the candidate subset of observation $z_{k,i+1}$ and which are not already associated to another node on the path between the start node and the node in layer i.

In a further embodiment of the method according to the invention, the data indicative of distance comprise distance data obtained using a time-of-flight (TOF) camera, wherein the distance data at least relates to distances between the TOF camera and the landmarks corresponding to the determined M features.

The TOF camera may have a camera center and determine distances between said camera center and objects in its field of view. The TOF camera may have an image sensor having pixels. In an idealized imaging setup, each pixel may be configured to measure a distance between the camera center and the first point on a reflective object surface of an object in the scene of interest at which a ray induced by the camera center and the 3D location of said pixel in space would intersect said object. For features which are actual projections of landmarks, the TOF camera may determine a distance between its camera center and the landmarks which correspond to features. For features which are outliers, the TOF camera may determine distances between its camera center and, e.g., the shiny reflective surfaces in the scene of interest which caused said outlier features.

In a further embodiment of the method according to the invention, the TOF camera comprises a plurality of phase detectors and a radio frequency (RF) modulated light source having an RF carrier having an RF carrier wavelength, wherein the distance data provided by the TOF camera are provided as distance data modulo the wavelength of the RF carrier.

In a further embodiment of the method according to the invention, the TOF camera comprises a maximum distance which it is capable of measuring and a minimum distance of zero, and wherein the determining of the injective mapping estimate as part of the determining of the state $x_k$ is based on those distance data between the minimum distance and the maximum distance which are, modulo the wavelength of the RF carrier, equivalent to the distance data provided by the TOF camera.

In a further embodiment of the method according to the invention, the data indicative of distance comprises intensity information for at least one of the determined M features.

In a further embodiment of the method according to the invention, the image is captured by the camera as a light source is operated to emit light which illuminates the scene of interest.

In a further embodiment of the method according to the invention, the determining the injective mapping estimate as part of the determining of the state $x_k$ comprises converting the intensity information into distance data using an illumination model which is configured to determine, using (i) the intensity information, (ii) a power of light emitted by the light source, (iii) a directivity of light emission by the light source, and (iii) a reflectivity of the landmarks, the distance of the at least one feature, for which intensity information is available, to its corresponding landmark.

In a further embodiment of the method according to the invention, the observation model comprises a camera model of the camera.

In a further embodiment of the method according to the invention, the camera model is embodied as a pinhole camera model.

According to a further aspect of the present invention there is provided a computer program product comprising instructions which when executed by a computer, cause the computer to carry out a method according to the invention.

According to a further aspect of the present invention there is provided an assembly, comprising (a) a camera, (b) a plurality of landmarks, and (c) a controller, wherein the controller is configured to carry out a method according to the invention.

The camera may be embodied as a conventional camera, or it may comprise time-of-flight (TOF) camera functionality.

In an embodiment of the assembly according to the invention, the assembly further comprises a light source.

In a further embodiment of the assembly according to the invention, the assembly further comprises a time-of-flight (TOF) camera.

The assembly may comprise a camera and a separate TOF camera. A known coordinate transformation between the camera and the separate TOF camera may be assumed to be known, implying that measuring results obtained by either camera may be translated between the respective local coordinate system of the two cameras.

BRIEF DESCRIPTION OF DRAWINGS

Exemplary embodiments of the invention are disclosed in the description and illustrated by the drawings in which.

DETAILED DESCRIPTION OF DRAWINGS

Figure 1:
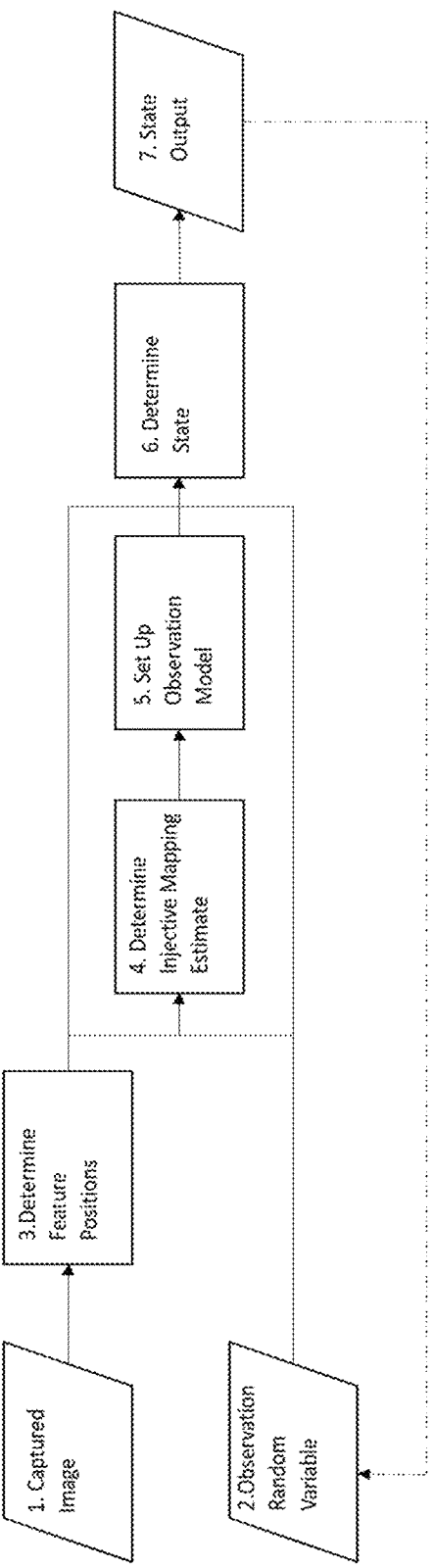
FIG. 1 shows a schematic depiction of the method according to the invention for determining a state $x_k$ of a camera at a time $t_k$.

FIG. 1 shows a schematic depiction of the method according to the invention for determining a state $x_k$ of a camera at a time $t_k$. The state $x_k$ may comprise a 3D position and a 3D orientation of the camera at the time $t_k$. The 3D position and the 3D orientation may be expressed with respect to a world coordinate system. The state $x_k$ may additionally comprise 3D velocity information of the camera at the time $t_k$, which 3D velocity information may, e.g., also be expressed with respect to the world coordinate system. As the camera may move through an indoor environment over time, its state may need to be tracked to determine current positions and orientations of the camera.

At the time $t_k$, the camera may capture an image 1 of a scene of interest in an indoor environment comprising N landmarks. Since, at the time $t_k$, the camera has a specific position and orientation, not all the N landmarks may be visible to the camera. For example, J≤N landmarks may be visible to the camera at the time $t_k$, which J landmarks are projected by the camera onto the image 1 of the scene of interest. The projection of a landmark into an image may be termed 'feature'. Features may, however, also be caused as outliers, wherein said outliers, e.g., are caused by shiny reflective objects in the scene of interest which are not landmarks. Based on the J landmarks projected onto the image 1, some features may be identified, and their positions in the image determined 3. Some of the J landmarks may be positioned and oriented to the camera at the time $t_k$ in such a way that their projections into the image are too small/dim/badly detectable. In this case, not all the J landmarks are projected by the camera into the image 1 in such a way their projections may be identified as features. The number of identified features M may be smaller than, equal to, or larger than J. 2D positions of the features, 2D positions, e.g., referring to 2D positions of centroids of the features, are determined from the identified features. The state $x_k$ of the camera at the time $t_k$ is typically not known and needs to be estimated. For such a state estimation, information in the captured image 1 is used. Furthermore, an initial guess of the state of the camera at the time $t_k$, the guessed state being a state estimate $\widehat{x_k}$, is used for the state estimation.

During the determining 6 of the state $x_k$ 7, an injective mapping estimate from at least a subset of the M features to the N landmarks is determined 4. Specifically, the injective mapping estimate is determined 4 for those of the M features which have been identified, during the determining 4, as corresponding to projections of landmarks. In case of outliers, not all the M features are actual projections of landmarks. The injective mapping estimate is typically only injective and not surjective as well, since typically not all N landmarks are projected at once onto the image 1. The injective mapping estimate describes which landmark of the N landmarks induced which feature of at least the subset of the M features in the image. The injective mapping estimate induces a feature-to-landmark assignment. In the exemplary embodiment of FIG. 2, a detailed description is given on how the determining 4 of the injective mapping estimate, as part of the determining 6 of the state $x_k$ 7, may be carried out.

The determining 6 of the state $x_k$ 7 is based on the setting up 5 of an observation model based on the injective mapping estimate. The observation model models the mapping of those landmarks—which landmarks correspond to at least the subset of the M features by way of the determined injective mapping estimate—onto an image plane on which an image sensor capturing the image is estimated to be located. The observation model is configured to map a state of the camera in which the camera is assumed to be at the time $t_k$ onto the observation random variable statistically describing 2D positions of features in the image 1. The observation model may be configured to map a state of the camera onto only a part of the observation random variable. The observation random variable may model observations onto which the observation model does not map. During the determining 6 of the state $x_k$ 7, the assumed state of the camera, also termed node-specific intermediate state as explained below with respect to the embodiment of FIG. 2, may change from the state estimate $\widehat{x_k}$ to the final state $x_k$ 7. As explained in greater detail in the description of the embodiment of FIG. 2, these changes of the assumed state of the camera may be occurring in the wake of the construction of the injective mapping estimate. Specifically, as the injective mapping estimate is constructed, different (and changing) feature-to-landmark assignments may be induced. As explained with respect to the embodiment of FIG. 2, using the observation model, the evolving state may be determined based on these changing feature-to-landmark assignments. The observation model may also comprise processing steps, e.g., for extracting a 2D position of a projected landmark, i.e., a feature, the 2D position, e.g., being a centroid of the feature in the image. The observation model may comprise a mathematical camera model, e.g., embodied as pinhole camera model, which mathematically describes the projection of a point in three-dimensional space onto a 2D space on which the image sensor of a camera lies.

The observation model may be part of a state-space model used for tracking a movement of the camera through space. Besides the observation model, the state-space model may typically comprise a state-transition model. The observation model may be configured to map a state random variable $X_k$, of which the state $x_k$ is a realization, onto an observation random variable statistically describing the 2D positions of those features which are assigned to landmarks through the injective mapping estimate respectively through the currently constructed injective mapping estimate, currently constructed referring to the construction during the determining 6 of the state $x_k$ 7 described in greater detail below with respect to the embodiment of FIG. 2. Measured 2D positions of the features are a realization of this observation random variable. The state-transition model, on the other hand, may describe how the state itself evolves over time. In case the camera is mounted on a mobile robot, for example, the state-transition model may comprise equations modelling mobile robot movement, the equations potentially comprising control input used for controlling the mobile robot movement. The mobile robot may be embodied as a drone, for example. The state-transition model typically may also comprise a further term modelling statistical uncertainty in state propagation. The observation model and/or the state-transition model may be linear or nonlinear in their input, which input is the state of the camera.

In case the observation model and the state-transition model are both linear, a Kalman filter may be used for determining 6 the state $x_k$ 7 at the time $t_k$. As described in more detail below with respect to the embodiment of FIG. 2, starting with the state estimate $\widehat{x_k}$, update equations of the Kalman filter using the observation model may typically be invoked a plurality of times during the determining 6 of the state $x_k$ 7, wherein the state of the camera may evolve during the determining 6 from the state estimate $\widehat{x_k}$ to the final output state $x_k$ 7. As the observation model may depend on the currently constructed injective mapping estimate and may specifically map onto those features which are assigned to landmarks by way of the currently constructed injective mapping estimate, the observation model may change during the determining 6 of the state $x_k$ 7. In case the observation model and/or the state-transition model are nonlinear, an extended Kalman filter may be used, wherein the extended Kalman filter linearizes the nonlinear equations. The update equations of the Kalman filter may be separately invoked for individual features assigned to a landmark by way of the currently constructed injective mapping estimate, or jointly for those features in at least the subset of M features which are assigned to landmarks, as further explained below with respect to the embodiment of FIG. 2, at a specific algorithmic time during the determining 6 of the state $x_k$ 7. The determined state $x_k$ 7 may be propagated in time, e.g., from time $t_k$ to time $t_{k+1}$, using the state-transition model, the propagation in time providing a state estimate $\widehat{x_{k+1}}$ for the state of the camera at the time $t_{k+1}$. Instead of Kalman filters, particle filters may be used, or state observers such as Luenberger observers may be used, or any other known filtering technique known from the state of the art.

FIG. 2 shows an exemplary embodiment of the determining 4 of an injective mapping estimate as part of the determining 6 of the state $x_k$ 7 at a time $t_k$. In this embodiment, the determining 4 of an injective mapping estimate is tightly interwoven with the setting up 5 of a changing observation model and the determining 6 of the state $x_k$ 7. In the exemplary embodiment of FIG. 2, three features are used, i.e., M=3, and four landmarks exist, i.e., N=4. It is furthermore assumed that all three features are projections of landmarks. In the following description of the embodiment shown in FIG. 2 it is assumed—unless explicitly mentioned to the contrary—that no outliers are present, i.e., whenever M features are mentioned, it is assumed that these M features correspond to projections of landmarks. The three features are symbolically represented as '1', '2', and '3', and the four landmarks are symbolically represented as 'A', 'B', 'C', and 'D'. The injective mapping estimate is determined from the set {'1', '2', '3'} to the set {'A', 'B', 'C', 'D'}. One element from the set of landmarks therefore does not comprise a corresponding element from the set of features. To each feature there corresponds observation $z_{k,i}$, i=1,2,3, wherein the 2D position of a feature i in the image captured at time $t_k$ is part of the observation $z_{k,i}$.

An assignment between a landmark and a feature, or more specifically between a landmark and the observation associated to a feature, induces a cost. If, at the time $t_k$, the camera is assumed to be in specific state, wherein said specific state may comprise an assumed position and an assumed orientation of the camera, the probability of observing observation $z_{k,i}$ depends on which landmark is considered to be associated to said observation (and on the assumed specific state). In principle, any landmark can be freely associated with any feature. At a specific pose and orientation of a camera with respect to a world coordinate system, however, some landmarks are related to the observation associated to a feature with a higher probability than other landmarks.

The observation $z_{k,i}$ associated to feature i at the time $t_k$ comprises the position of the feature in the image, the feature, e.g., being a scale-invariant feature transform (SIFT) feature. An image sensor capturing the image with said feature has a position and orientation with respect to the world coordinate system. Equivalently, a feature with a 2D position in the image has a corresponding 3D position with respect to the world coordinate system as a result of the image sensor being located in 3D space. As a camera is a projective device, it may be mathematically described by a camera model, e.g., a pinhole camera model. Using such a camera model as well as a specific state—the assumed position and orientation of the camera comprised by the specific state may be mathematically related to the world coordinate system—a landmark, whose position (and possibly orientation) is known in the world coordinate system, may be mathematically projected onto an image plane on which the image sensor capturing the image is located (according to the assumed specific state). Such a projection may additionally comprise statistical uncertainty. The 2D position of a feature which is mathematically projected onto the image plane may therefore be considered to be a random variable due to this statistical uncertainty. A measured 2D position of a feature, which measured 2D position is part of the observation, may be considered to be a realization of this random variable.

Using a mathematical camera model of a camera which is estimated to be in a specific state at the time $t_k$, all landmarks can in principle be mathematically projected onto the image plane of said mathematical camera model. The result of each of these projections can be described using random variables, and the probability distributions of these random variables may be evaluated at the measured observation.

Costs used for determining 4 an injective mapping estimate as part of the determining 6 of the state $x_k$ 7 may therefore be constructed as follows: given a mathematical camera model of a camera assumed to be in a specific state statistical models may be set up which statistically model an observable, the observable, also termed observation random variable, e.g., being the 2D position of a mathematically projected landmark in the image plane, or the distance between a landmark and a time-of-flight (TOF) camera, which TOF camera functionality may be part of the camera or which TOF camera may be a separate device (if the TOF camera and the camera are separate devices, a coordinate transform between respective local coordinate systems of the camera and the TOF camera may be assumed to be known). Another observation random variable may be an intensity of an imaged landmark in the image. Such statistical models, conditioned on the assumed specific state of the camera, may be set up for all landmarks or a subset of landmarks, and the resulting conditional probability distributions (or conditional probability density functions), conditioning taking place with respect to the assumed specific state of the camera, of the resulting statistical models may be evaluated at the measured observation. For landmarks which likely induced a specific observation, this evaluation will produce larger values than for landmarks which are unlikely to have caused it. These evaluations of the conditional probability density functions (or conditional probability distributions) associated to different landmarks at the measured observation may be taken as costs. To compress the observed range of costs, a logarithm of the conditional probability density functions (or of the conditional probability distributions) may be taken.

The determining 4 of an injective mapping estimate as part of the determining 6 of the state $x_k$ 7 may start with a start node. During the determining 4 of the injective mapping estimate, a tree data structure may be built up. Once the determining 4 of the injective mapping estimate is completed, the constructed tree data structure may have three layers corresponding to the three features in the exemplary embodiment of FIG. 2. In the following exemplary description, the state is updated recursively, i.e., each new assigned feature-to-landmark pair is individually used for updating the state from the original state estimate $\widehat{x_k}$ to the final state $x_k$ 7. Alternatively, cumulative updating may also occur by, for example, jointly using all feature-to-landmark pairs on a path between the start node and a currently considered node.

Figure 2A:
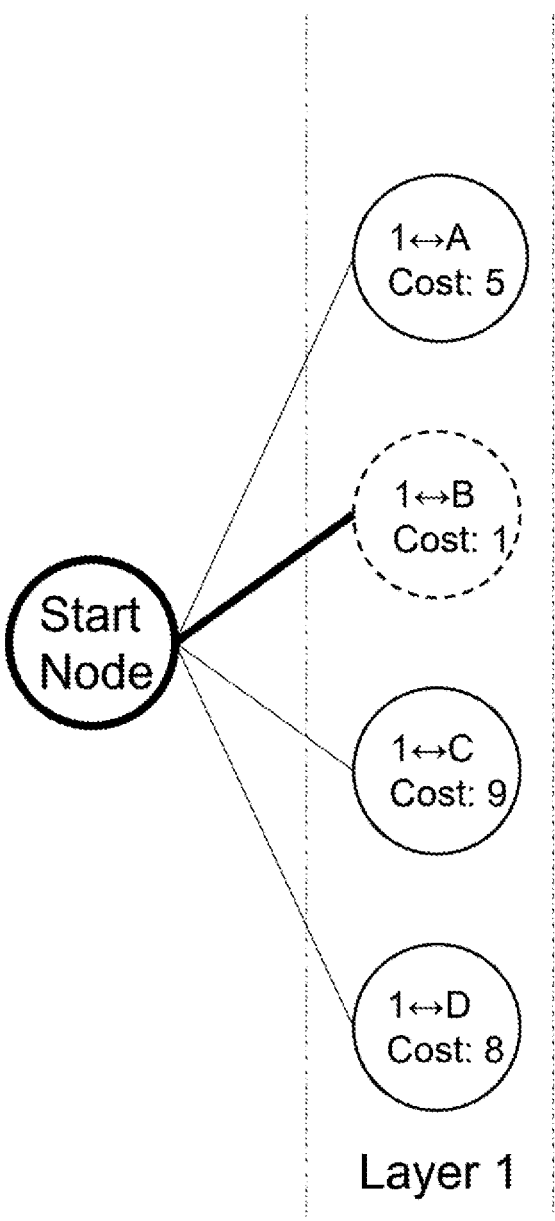
FIG. 2 shows an exemplary embodiment of the determining of an injective mapping estimate as part of the determining of a state $x_k$ at a time $t_k$ in the method according to the invention.

At first, as shown in FIG. 2a, a tree construction function may be invoked with the start node being an input to the tree construction function. In the following, the start node is considered to be in layer zero of the tree data structure. Layer zero is not counted among the layers of the constructed tree data structure. The tree construction function constructs layer one of the tree data structure by determining costs between the first feature '1' and each of the four landmarks 'A', 'B', 'C', and 'D', respectively. The costs are determined by assuming that the camera capturing the image 1 is in a state according to the state estimate $\widehat{x_k}$. The first layer in the exemplary embodiment of FIG. 2 therefore has four nodes. By applying a cost determination function to the currently constructed tree data structure, the cost determination function determines that node '1'↔'B' (corresponding to feature '1' and landmark 'B') is associated to the smallest cost.

Figure 2B:
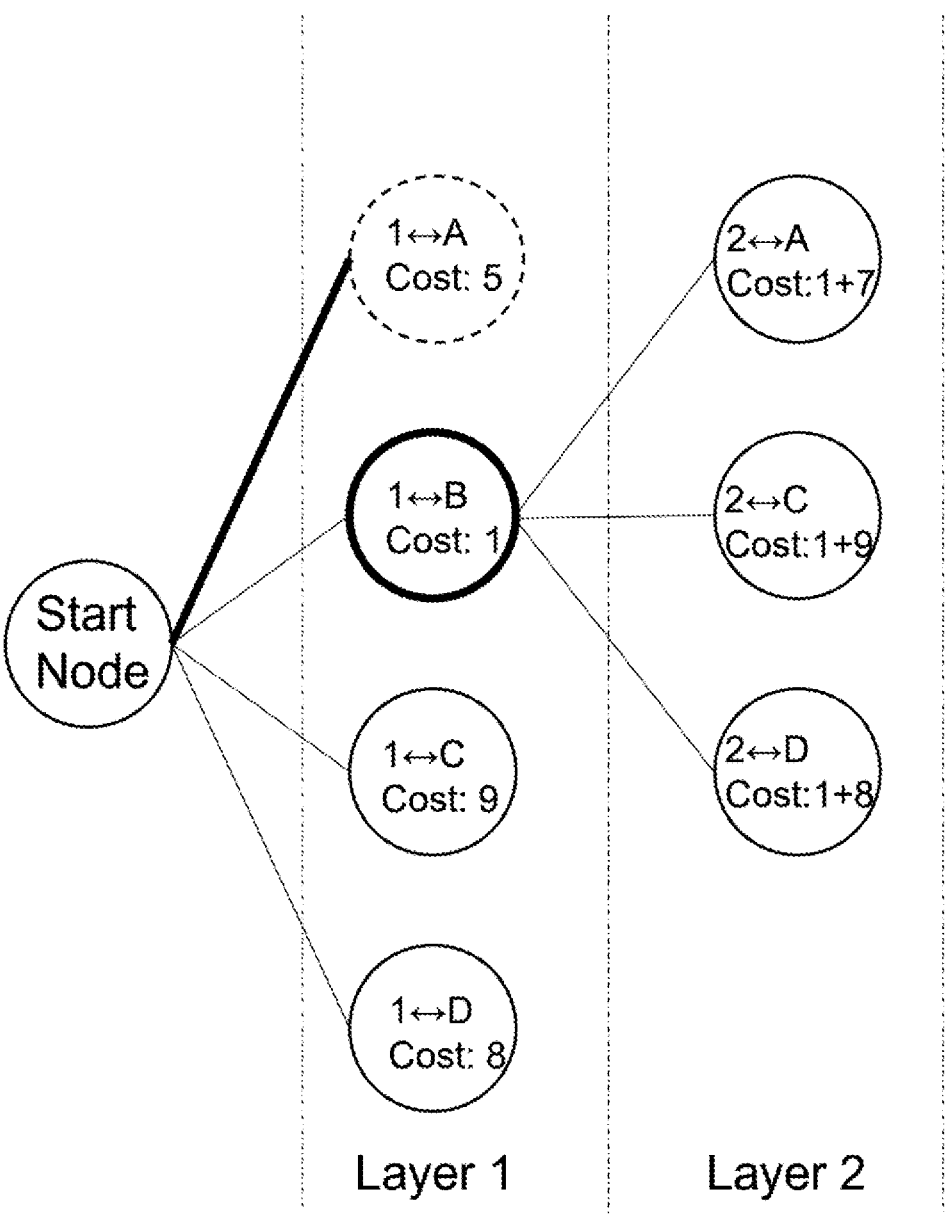

As shown in FIG. 2b, node '1'↔'B' is subsequently passed to the tree construction function which is configured to start building up layer two of the tree data structure from node '1'↔'B'. Since, starting from node '1'↔'B', landmark 'B' has already been assigned (and since the sought mapping between the set of features and the set of landmarks is injective), the tree construction function determines only costs for nodes '2'↔'A', '2'↔'C', and '2'↔'D' in layer two, and constructs these nodes and connects them to the previously constructed node '1'↔'B'. For determining these costs, a node-specific intermediate state is determined based on the previously determined feature-to-landmark assignment '1'↔'B' and the state estimate $\widehat{x_k}$. The node-specific intermediate state may be obtained by updating the previous state, the previous state in this iteration of the algorithm being $\widehat{x_k}$ since node '1'↔'B' is connected to the start node, by using, for example, update equations provided by a Kalman filter using an observation model set up so as to describe the mapping of landmark 'B' onto feature '1', assuming that the camera is in state $\widehat{x_k}$. The costs for the nodes that are constructed in layer two and are connected to the previously constructed node '1'↔'B' are determined under the assumption that the camera is in the newly determined node-specific intermediate state. Next, the cost determination function is applied to the currently constructed tree data structure: for each leaf node in the currently constructed tree data structure, i.e., for nodes '1'↔'A', '1'↔'C', '1'↔'D', '2'↔'A', '2'↔'C', and '2'↔'D', the cost determination function computes (or loads for leaf nodes for which the computation has already taken place) an accumulated cost for each leaf node between the respective leaf node and the start node: for leaf node '2'↔'A', for example, the accumulated cost is equal to the sum of the costs of '1'↔'B' (determined under the assumption that the camera is in state $\widehat{x_k}$ and '2'↔'A' (determined under the assumption that the camera is in the newly determined node-specific intermediate state). In the following, when the term cost is used for a node in layer two or three, the term cost refers to the accumulated cost for that node. The cost can be computed recursively, i.e., for a node in layer i, the cost of said node may be added to the cost of the node in layer i−1 to which it is connected to obtain the accumulated cost for the node in layer i. Among the leaf nodes in the currently constructed tree data structure, node '1'↔'A' has the lowest cost.

Figure 2C:
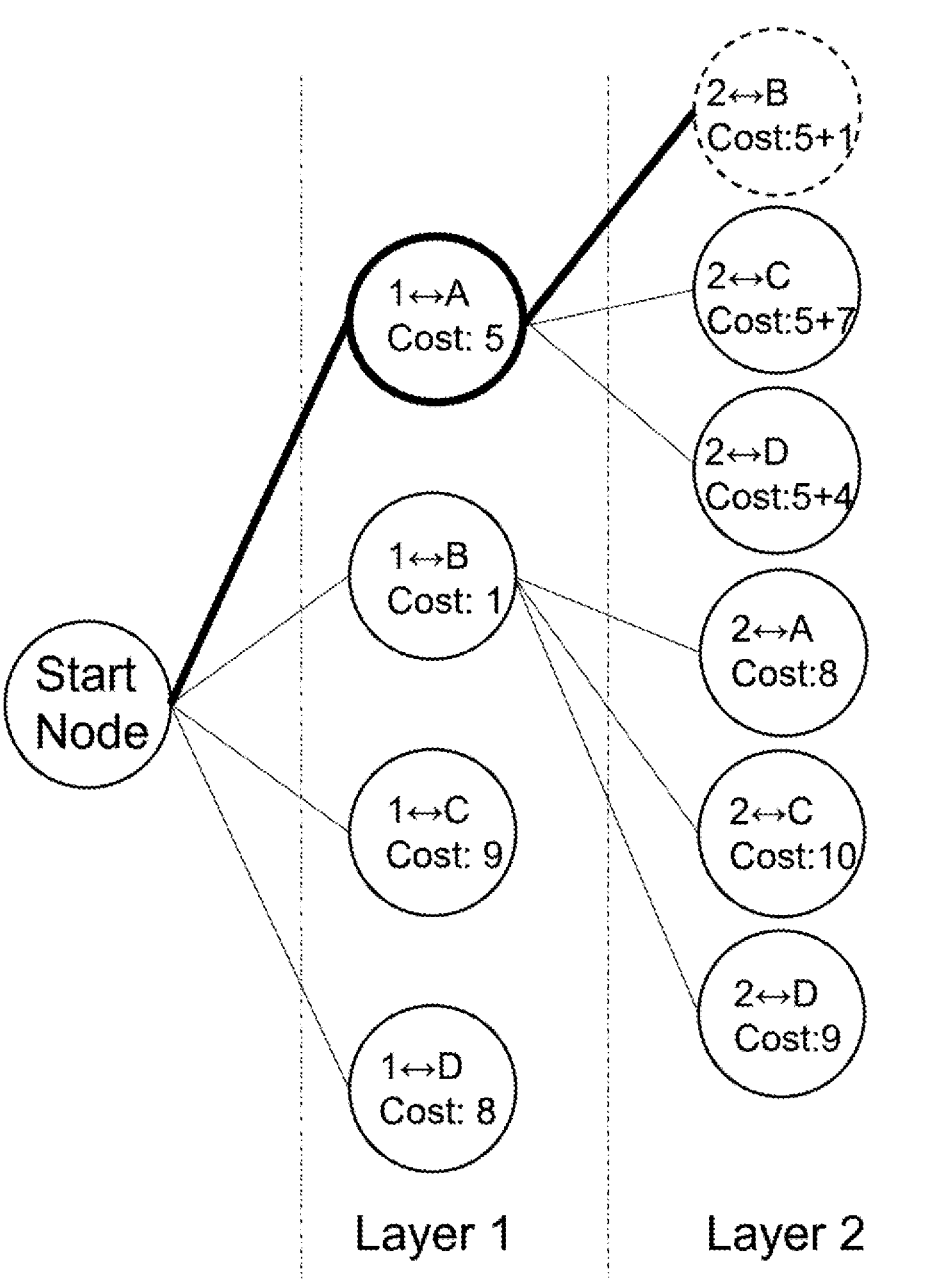

As shown in FIG. 2c, the tree construction function is subsequently called with node '1'↔'A' as input. Since landmark 'A' has already been assigned, the tree construction function constructs the nodes '2'↔'B', '2'↔'C', and '2'↔'D' in layer two, and computes costs for these constructed nodes and connects them to node '1'↔'A'. For determining these costs, a node-specific intermediate state is determined based on the previously determined feature-to-landmark assignment (in the hierarchy of the so far constructed tree data structure) '1'↔'A' and the state estimate $\widehat{x_k}$. The node-specific intermediate state may be obtained by updating the previous state, the previous state in this iteration of the algorithm being $\widehat{x_k}$ since node '1'↔'A' is connected to the start node, by using, for example, update equations provided by a Kalman filter using an observation model set up so as to describe the mapping of landmark 'A' onto feature '1', assuming that the camera is in state $\widehat{x_k}$. The costs for the nodes that are constructed in layer two and are connected to the previously constructed node '1'↔'A' are determined under the assumption that the camera is in the newly determined node-specific intermediate state. The cost determination function is subsequently invoked, wherein said cost determination function determines, for the currently constructed tree data structure, that node '2'↔'B' has the lowest (accumulated) cost of all leaf nodes in the currently constructed tree data structure.

Figure 2D:
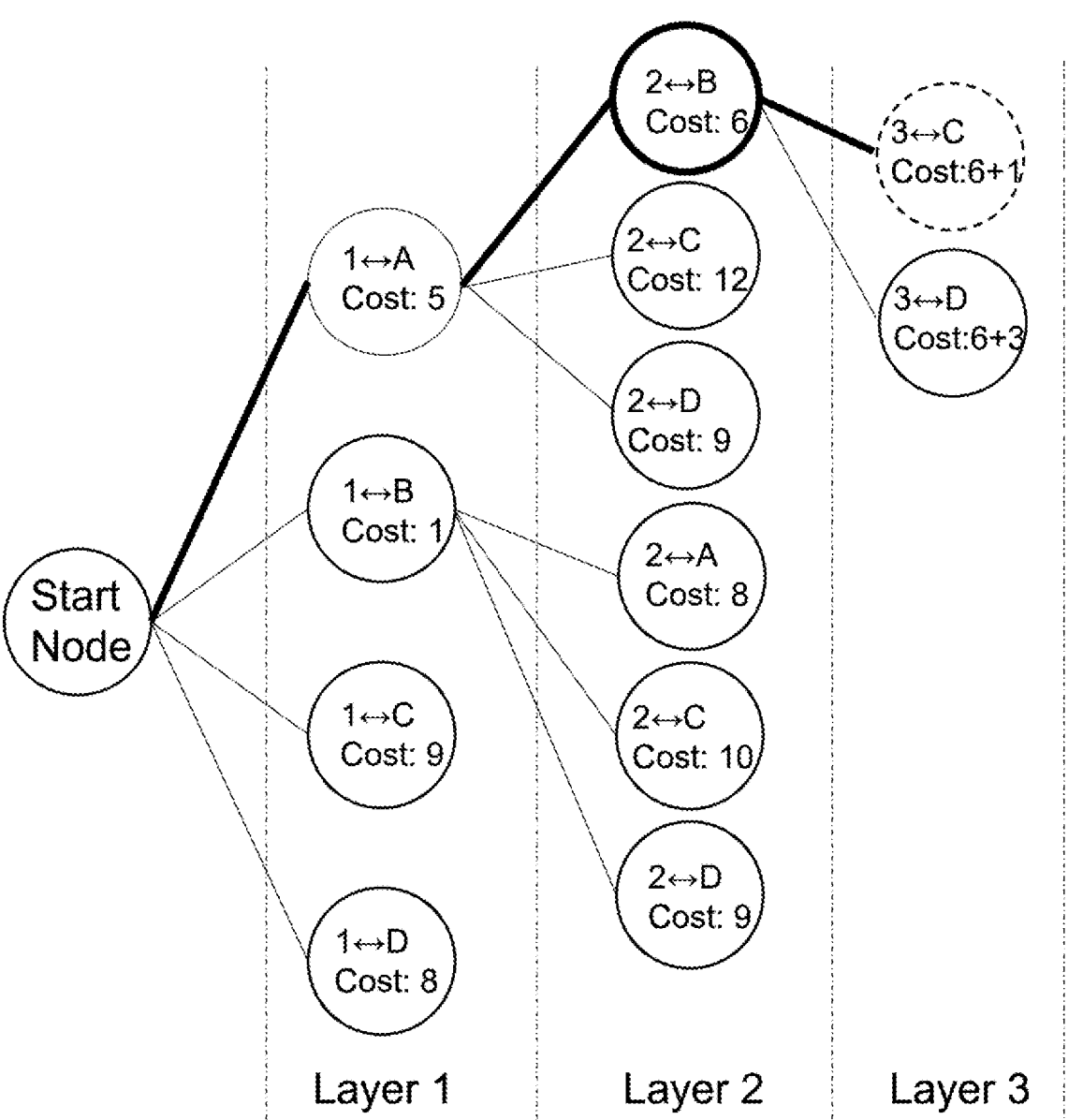

As shown in FIG. 2d, in a next iteration the tree construction function is invoked with node '2'↔'B' as input. Since, on the path between the start node and node '2'↔'B', landmarks 'A' and 'B' have already been assigned, the tree construction function only constructs nodes '3'↔'C' and '3'↔'D' in layer three, computes their costs and connects them to the node '2'↔'B'. For determining these costs, a node-specific intermediate state is determined based on the previously determined feature-to-landmark assignments (in the hierarchy of the so far constructed tree data structure) '1'↔'A' and '2'↔'B', and on the previously determined node-specific intermediate state determined for node '1'↔'A'. The node-specific intermediate state may be obtained by updating the previous state, the previous state in this iteration of the algorithm being the node-specific intermediate state determined for node '1'↔'A' since node '2'↔'b' is connected to node '1'↔'A', by using, for example, update equations provided by a Kalman filter using an observation model set up so as to describe the mapping of landmark 'B' onto feature '2', assuming that the camera is in the previously determined node-specific intermediate state determined for node '1'↔'A'. The costs for the nodes that are constructed in layer three and are connected to the previously constructed node '2'↔'B' are determined under the assumption that the camera is in the newly determined node-specific intermediate state. The cost determination function is then invoked with the currently constructed tree data structure as input. The cost determination function determines that node '3'↔'C' has the lowest (accumulated) cost among all leaf nodes in the currently constructed tree data structure. Since all features have been assigned at this point to landmarks, i.e., three layers are constructed in the exemplary embodiment of FIG. 2, and since a leaf node has been identified in the last layer with lowest overall cost, the determining 4 of the injective mapping estimate as part of the determining 6 of the state $x_k$ 7 is completed. The leaf node '3'↔'C' may therefore be termed finish leaf node. The state $x_k$ 7 may be determined using the feature-to-landmark assignments on the path from the start node to the finish leaf node. The determined injective mapping estimate is encoded in the path between the start node and finish leaf node '3'↔'C': feature '1' is mapped to landmark 'A', feature '2' is mapped to landmark 'B', and feature '3' is mapped to landmark 'C'. Landmark 'D' is not assigned to any feature.

In case the observation random variable models distance data between a landmark and a time-of-flight (TOF) camera which has phase ambiguity, the phase ambiguity of the TOF camera may be resolved during the determining 4 of the injective mapping estimate. A phase-ambiguous TOF camera comprises a plurality of phase detectors and a radio frequency (RF) modulated light source having an RF carrier having an RF carrier wavelength, and the distance data provided by the phase-ambiguous TOF camera are provided as distance data modulo the RF carrier wavelength. Since TOF cameras typically comprise a maximum distance which they are capable of measuring and a minimum distance of zero, during the determining 4 of the injective mapping estimate those distance data between the minimum distance and the maximum distance may be considered which are, modulo the wavelength of the RF carrier, equivalent to the distance data provided by the TOF camera. To accommodate such phase-ambiguous distance data, the tree construction function may be modified as follows: the conditional probability distribution (or probability density function) of a constructed node is evaluated at the observation $$z_k^n,$$

wherein n indexes over the distances between the minimum distance and the maximum distance which are, modulo the RF carrier wavelength, equivalent to the distance data provided by the TOF camera. If K such distances exist for a feature i, the tree construction function may construct K nodes in parallel for each assignment of feature i to a landmark.

The feature-to-landmark assignment process as described above algorithmically proceeds after the time $t_k$. All determined assignments, however, refer back to the time $t_k$. In case a subsequent image is captured at time $t_{k+1}$, $t_{k+1} > t_k$, and in case that not all features have yet been assigned to landmarks for the time $t_k$, the determining 4 of the injective mapping estimate may terminate prematurely. In this case, only L<M may have been assigned to landmarks once the subsequent image is captured at the time $t_{k+1}$.

In case additional information is provided, the determining 4 of the injective mapping estimate may be accelerated. As the positions (and potentially the orientations) of the N landmarks in the world coordinate system are known and since the estimated state $\widehat{x_k}$ of the camera is given, distances between each of the N landmarks and the camera in the estimated state $\widehat{x_k}$ at the time $t_k$ may be determined. If, for example, distance information is provided, which distance information may state that the landmark which caused feature i in an image capture at the time $t_k$ is d meters away (the distance may be provided with statistical uncertainty), the determined distances between the camera and the N landmarks at the time $t_k$ may be compared to the distance d: landmarks which are too far away from the camera or too close to the camera (compared to d) may be disregarded during the construction of the tree data structure. If the tree construction function is, e.g., invoked with a specific node in layer i as input, then during construction of the next layer i+1 those nodes may be disregarded which correspond to landmarks which are too far away or too close to the camera (compared to distance d obtained for feature i+1). Closeness to the distance d may, e.g., be evaluated using a predetermined threshold.

Distance d may be obtained using a TOF camera. Alternatively, it may be determined using intensity information: in case an illumination model is provided, which illumination model may model power losses of light emitted by a light source between emission by the light source and reception by the camera, wherein the illumination model may comprise a reflectivity of a landmark at which the emitted light is reflected, the distance (potentially with statistical uncertainty) between a feature i and the landmark to which it corresponds may be determined using said illumination model.

In general, the M features may, however, also comprise outliers which are not the result of a projection of a landmark into the image. To deal with outliers, the tree construction function may be modified as follows: instead of constructing N−i nodes in layer i+1 starting from a node in layer i, the tree construction function may construct N−i+1 nodes, wherein in the additional outlier node a cost for feature i+1 being an outlier is saved: the likelier it is that feature i+1 is an outlier, the lower the assigned cost to the additional outlier node. Likelihood of feature i+1 being an outlier may be determined based on the costs of the remaining constructed N−i nodes and the costs of the nodes in layer i+1 in the previously constructed tree data structure. Since a node corresponding to an outlier does not comprise a feature-to-landmark pair, such a node is not used for determining 6 the state $x_k$ 7 of the camera.

Figure 3:
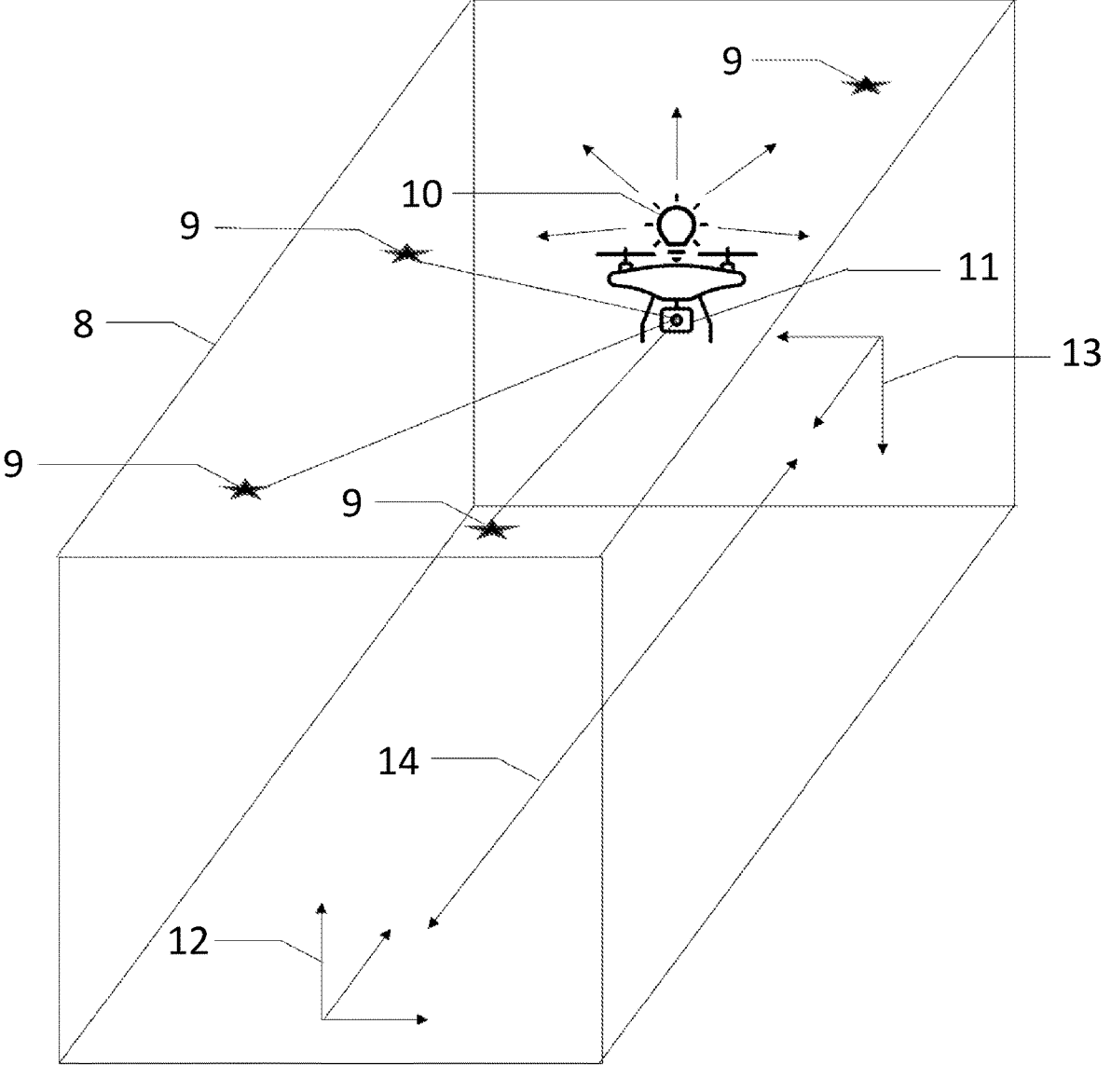
FIG. 3 shows a schematic depiction of a drone comprising a light source and a camera, wherein the drone is configured to fly in an indoor environment, wherein landmarks are arranged at a plurality of positions in said indoor environment.

FIG. 3 shows a schematic depiction of a drone comprising a light source 10 and a camera 11, which drone is flying in an indoor environment 8. Landmarks 9, in particular embodied as retroreflectors, are arranged at a plurality of positions in the indoor environment 8. The landmarks 9 may be mounted on a ceiling of the indoor environment 8. At any given pose of the drone, some landmarks 9 may be visible to the camera 11—in FIG. 3 indicated by lines between the landmarks 9 and the camera 11—while other landmarks 9 may not be visible to the camera 11. A currently imaged part of the indoor environment 8 may be termed scene of interest 8. The positions (and possibly orientations) of the landmarks 9 may be known in a world coordinate system 12, and the current location of the drone may be expressed as a drone coordinate system 13, wherein a coordinate transformation 14 may be known between the world coordinate system 12 and the drone coordinate system 13. In case the camera 11 and the light source 10 are mounted rigidly to the drone, the pose of the camera 11 and of the light source 10 can be related to the world coordinate system 12 using the drone coordinate system 13. The current position of the drone can be determined using image(s) of scene(s) of interest 8, specifically of the landmarks 9 having known positions. Alternatively, or in addition, the drone may be equipped with an inertial measurement unit, which inertial measurement unit may be also used for pose determination. The light source 10 may be an isotropically emitting light source, or it may be a directional light source emitting in a non-isotropic manner. Light source 10 and camera 11 are ideally close to each other, specifically in case the landmarks 9 are embodied as retroreflectors. The camera 11 may also be mounted on top of the drone, i.e., next to the light source 10. The drone may additionally comprise a time-of-flight (TOF) camera for directly measuring distances to the landmarks 9. TOF camera functionality may be provided by a separate TOF camera, or TOF camera functionality may be included in the camera 11.

The invention claimed is:

1. Method for determining a state xx of a camera at a time $t_k$, the state $x_k$ being a representation of a state random variable $X_k$, wherein the state is related to a state-space model of a movement of the camera, the method comprising:
   a) receiving an image of a scene of interest in an indoor environment captured by the camera at the time $t_k$, wherein the indoor environment comprises N landmarks having known positions in a world coordinate system, N being a natural number;
   b) receiving a state estimate $\widehat{x_k}$ of the camera at the time $t_k$, wherein the state estimate comprises an estimate of the pose of the camera;
   c) determining positions of M features in the image, M being a natural number; and
   d) determining the state $x_k$ of the camera at the time $t_k$ based on (i) observation $Z_k$ at the time $t_k$, the observation $z_k$ being a representation of a joint observation random variable $Z_k$, the observation $z_k$ comprising the positions of the M features and data indicative of distance between each of the M features and its corresponding object point in the scene of interest, respectively, and (ii) the state estimate $\widehat{x_k}$, wherein the determining of the state $x_k$ comprises determining an injective mapping estimate from at least a subset of the M features into the set of the N landmarks, and wherein the determining of the state $x_k$ is based on an observation model set up based on the determined injective mapping estimate.

2. Method according to claim 1, wherein the joint observation random variable $Z_k$ comprises M observation random variables $Z_{k,i}$, i=1, . . . , M, which M observation random variables are ordered in an observation random variable sequence, wherein a representation of the observation random variable sequence provides an observation sequence $z_{k,i}$, i=1, . . . , M.

3. Method according to claim 2, wherein the determining of the injective mapping estimate, as part of the determining of the state $x_k$, from at least the subset of the M features into the set of N landmarks, the subset comprising L features, is based on a tree data structure having leaf nodes and inner nodes, and having a start node and at most a tree depth of L, wherein the tree data structure is constructed during the determining of the state $x_k$ and the determining of the injective mapping estimate as part of the determining of the state $x_k$, and wherein each layer of the L layers of the tree data structure is associated with a sequence element of a subsequence of the observation sequence, wherein said subsequence comprises those sequence elements from the observation sequence corresponding to the L features, and wherein each node in the tree data structure except the start node is associated with a 5-tuple comprising (a) a layer number i related to the layer of the tree data structure in which the respective node is arranged, (b) an observation $z_{k,i}$, (c) a landmark assigned to the observation $z_{k,i}$, wherein the assigned landmark and the layer number i provide a feature-to-landmark assignment associated to the respective node, (d) a node-specific intermediate state of the camera, wherein said node-specific intermediate state of the camera is determined based on feature-to-landmark assignments corresponding to nodes on a path from the start node to the respective node in layer number i, and (e) a cost related to (i) the observation $Z_{k,i}$, (ii) the assigned landmark, and (iii) the node-specific intermediate state of the camera, wherein the start node is associated to a cost of zero and has layer number 0, and wherein each node in the tree data structure comprises a unique path to the start node, and wherein the determining of the injective mapping estimate is based on (i) a cost determination function which is configured to determine (a) for each leaf node in a currently constructed tree data structure, a cost, which cost is a sum of all costs associated to the nodes on the path between the start node and the respective leaf node and including the respective leaf node, and (b) a leaf node with the lowest cost, and (ii) a tree construction function which receives as input a leaf node in a currently constructed tree data structure having layer number i, and constructs N-i new leaf nodes in layer i+1 corresponding to observation $Z_{k,i+1}$, wherein said N-i new leaf nodes are connected to the received leaf node, and which N-i new leaf nodes are related to the N-i landmarks which have not been previously considered on the path between the start node and the received leaf node including the received leaf node, and wherein the cost of each of the N-i new leaf nodes is based on the conditional probability density of observing $z_{k,i+1}$ under the assumption that $z_{k,i+1}$ is induced by one of the N-i landmarks using a corresponding observation model, respectively, which corresponding observation model is set up under the assumption that the camera is in a node-specific intermediate state determined based on the feature-to-landmark assignments on the path from the start node to the received leaf node, or under the assumption that the camera is in the state according to the state estimate $\widehat{x_k}$ in case the tree construction function receives the start node as input, wherein the tree construction function outputs a tree data structure with at least i+1 constructed layers, and wherein the determining of the injective mapping estimate as part of the determining of the state $x_k$ proceeds by iteratively invoking the function pair (i) the tree construction function, in a first iteration having the start node as input, and (ii) the cost determination function evaluated on the output of the tree construction function, wherein the leaf node with the lowest cost provided by the cost determination function evaluated on a currently constructed tree data structure is used as input to the tree construction function in a next iteration, and wherein the iteration finishes once all L layers of the tree data structure are constructed and a finish leaf node in the L-th layer has, upon evaluation by the cost determination function, the lowest cost of all leaf nodes in the tree data structure, and wherein upon finishing, the injective mapping estimate is encoded in the path between the start node and the finish leaf node in the L-th layer, and wherein upon finishing, the state $x_k$ of the camera is determined based on the feature-to-landmark assignments on the path from the start node to the finish leaf node.

4. Method according to claim 3, wherein the cost of a node in layer number i of the tree data structure is related to a conditional probability density $p(Z_{k,i}|X_k=$"node−specific intermediate state"), wherein the cost is obtained by taking a logarithm of the conditional probability density.

5. Method according to claim 3, wherein for each of the L features, the corresponding data indicative of distance is used for determining a candidate subset of the N landmarks to which the respective feature may correspond, and using the candidate subsets for the determining of the injective mapping estimate as part of the determining of the state $x_k$.

6. Method according to claim 5, wherein the tree construction function, evaluated on a node in layer i, considers only those landmarks during construction of the nodes in layer i+1 connected to the node in layer i which are in the candidate subset of observation $Z_{k,i+1}$ and which are not already associated to another node on the path between the start node and the node in layer i.

7. Method according to claim 1, wherein the data indicative of distance comprise distance data obtained using a time-of-flight (TOF) camera, wherein the distance data at least relate to distances between the TOF camera and the landmarks corresponding to the determined M features.

8. Method according to claim 7, wherein the TOF camera comprises a plurality of phase detectors and a radio frequency (RF) modulated light source having an RF carrier having an RF carrier wavelength, wherein the distance data provided by the TOF camera are provided as distance data modulo the wavelength of the RF carrier.

9. Method according to claim 8, wherein the TOF camera comprises a maximum distance which it is capable of measuring and a minimum distance of zero, and wherein the determining of the injective mapping estimate as part of the determining of the state $x_k$ is based on those distance data between the minimum distance and the maximum distance which are, modulo the wavelength of the RF carrier, equivalent to the distance data provided by the TOF camera.

10. Method according to claim 1, wherein the data indicative of distance comprises intensity information for at least one of the determined M features.

11. Method according to claim 1, wherein the image is captured by the camera as a light source is operated to emit light which illuminates the scene of interest.

12. Method according to claim 11, wherein the determining the injective mapping estimate as part of the determining of the state xx comprises converting intensity information into distance data using an illumination model which is configured to determine, using (i) intensity information, (ii) a power of light emitted by the light source, (iii) a directivity of light emission by the light source, and (iii) a reflectivity of the landmarks, the distance of the at least one feature, for which intensity information is available, to its corresponding landmark.

13. Method according to claim 1, wherein the observation model comprises a camera model of the camera.

14. Method according to claim 13, wherein the camera model is embodied as a pinhole camera model.

15. Computer program product stored on a non-transitory computer-readable medium comprising instructions which when executed by a computer, cause the computer to carry out a method according to claim 1.

16. Assembly, comprising (a) a camera, (b) a plurality of landmarks, and (c) a controller, wherein the controller is configured to carry out a method according to claim 1.

17. Assembly according to claim 16, further comprising a light source.

18. Assembly according to claim 16, further comprising a time-of-flight (TOF) camera.

19. Method according to claim 1 wherein determining the injective mapping estimate comprises constructing a tree data structure having L layers corresponding to L features, iteratively expanding the tree by generating child nodes representing candidate feature-to-landmark assignments, and selecting a path through the tree based on a cost function.

20. Method according to claim 1 wherein determining the injective mapping estimate comprises representing each candidate feature-to-landmark assignment as a node in a search structure, associating each node with a node-specific intermediate state of the camera computed from the feature-to-landmark assignments along a path from a start node to that node, and determining the injective mapping estimate based on the node-specific intermediate states.

21. Method according to claim 1 wherein determining the injective mapping estimate comprises evaluating, for each candidate feature-to-landmark assignment, a cost based on a conditional probability density of observing the feature given the landmark and a corresponding camera state, and selecting as the injective mapping estimate the assignment path having the lowest accumulated cost.

22. Method for determining a state $x_k$ of a camera at a time $t_k$, the state $x_k$ being a representation of a state random variable $X_k$, wherein the state is related to a state-space model of a movement of the camera, the method comprising:

a) receiving an image of a scene of interest in an indoor environment captured by the camera at the time $t_k$, wherein the indoor environment comprises N landmarks having known positions in a world coordinate system, N being a natural number;

b) receiving a state estimate $\widehat{x_k}$ of the camera at the time $t_k$, wherein the state estimate comprises an estimate of the pose of the camera;

c) determining positions of M features in the image, M being a natural number; and d) determining the state xx of the camera at the time $t_k$ based on (i) observation $Z_k$ at the time $t_k$, the observation $z_k$ being a representation of a joint observation random variable $Z_k$, the observation $z_k$ comprising the positions of the M features and data indicative of distance between each of the M features and its corresponding object point in the scene of interest, respectively, and (ii) the state estimate $\widehat{x_k}$, wherein the determining of the state $x_k$ comprises determining an injective mapping estimate from at least a subset of the M features into the set of the N landmarks, and wherein the determining of the state $x_k$ is based on an observation model set up based on the determined injective mapping estimate;

wherein the joint observation random variable $Z_k$ comprises M observation random variables $Z_{k,i}$, i=1, . . . , M, which M observation random variables are ordered in an observation random variable sequence, wherein a representation of the observation random variable sequence provides an observation sequence $z_{k,i}$, i=1, . . . , M; and wherein the determining of the injective mapping estimate, as part of the determining of the state $x_k$, from at least the subset of the M features into the set of N landmarks, the subset comprising L features, is based on a tree data structure having leaf nodes and inner nodes, and having a start node and at most a tree depth of L, wherein the tree data structure is constructed during the determining of the state $x_k$ and the determining of the injective mapping estimate as part of the determining of the state $x_k$, and wherein each layer of the L layers of the tree data structure is associated with a sequence element of a subsequence of the observation sequence, wherein said subsequence comprises those sequence elements from the observation sequence corresponding to the L features, and wherein each node in the tree data structure except the start node is associated with a 5-tuple comprising (a) a layer number i related to the layer of the tree data structure in which the respective node is arranged, (b) an observation $z_{k,i}$, (c) a landmark assigned to the observation $z_{k,i}$, wherein the assigned landmark and the layer number i provide a feature-to-landmark assignment associated to the respective node, (d) a node-specific intermediate state of the camera, wherein said node-specific intermediate state of the camera is determined based on feature-to-landmark assignments corresponding to nodes on a path from the start node to the respective node in layer number i, and (e) a cost related to (i) the observation $z_{k,i}$, (ii) the assigned landmark, and (iii) the node-specific intermediate state of the camera, wherein the start node is associated to a cost of zero and has layer number 0, and wherein each node in the tree data structure comprises a unique path to the start node, and wherein the determining of the injective mapping estimate is based on (i) a cost determination function which is configured to determine (a) for each leaf node in a currently constructed tree data structure, a cost, which cost is a sum of all costs associated to the nodes on the path between the start node and the respective leaf node and including the respective leaf node, and (b) a leaf node with the lowest cost, and (ii) a tree construction function which receives as input a leaf node in a currently constructed tree data structure having layer number i, and constructs N-i new leaf nodes in layer i+1 corresponding to observation $z_{k,i+1}$, wherein said N-i new leaf nodes are connected to the received leaf node, and which N-i new leaf nodes are related to the N-i landmarks which have not been previously considered on the path between the start node and the received leaf node including the received leaf node, and wherein the cost of each of the N-i new leaf nodes is based on the conditional probability density of observing $z_{k,i+1}$ under the assumption that $z_{k,i+1}$ is induced by one of the N-i landmarks using a corresponding observation model, respectively, which corresponding observation model is set up under the assumption that the camera is in a node-specific intermediate state determined based on the feature-to-landmark assignments on the path from the start node to the received leaf node, or under the assumption that the camera is in the state according to the state estimate $\widehat{x}_k$ in case the tree construction function receives the start node as input, wherein the tree construction function outputs a tree data structure with at least i+1 constructed layers, and wherein the determining of the injective mapping estimate as part of the determining of the state $x_k$ proceeds by iteratively invoking the function pair (i) the tree construction function, in a first iteration having the start node as input, and (ii) the cost determination function evaluated on the output of the tree construction function, wherein the leaf node with the lowest cost provided by the cost determination function evaluated on a currently constructed tree data structure is used as input to the tree construction function in a next iteration, and wherein the iteration finishes once all L layers of the tree data structure are constructed and a finish leaf node in the L-th layer has, upon evaluation by the cost determination function, the lowest cost of all leaf nodes in the tree data structure, and wherein upon finishing, the injective mapping estimate is encoded in the path between the start node and the finish leaf node in the L-th layer, and wherein upon finishing, the state $x_k$ of the camera is determined based on the feature-to-landmark assignments on the path from the start node to the finish leaf node.

\* \* \* \* \*